(12) United States Patent
Cho

(10) Patent No.: US 9,007,317 B2
(45) Date of Patent: Apr. 14, 2015

(54) APPARATUS AND METHOD FOR CONTROLLING DISPLAYED OBJECT AND TACTILE FEEDBACK

(71) Applicant: LG Electronics Inc., Seoul (KR)

(72) Inventor: Eunhyung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 162 days.

(21) Appl. No.: 13/722,560

(22) Filed: Dec. 20, 2012

(65) Prior Publication Data

US 2014/0145970 A1 May 29, 2014

(30) Foreign Application Priority Data

Nov. 27, 2012 (KR) .................. 10-2012-0135076

(51) Int. Cl.
*G06F 3/041* (2006.01)
*G06F 3/01* (2006.01)
*G06F 3/0486* (2013.01)
*G06F 3/0488* (2013.01)
*G06F 3/0484* (2013.01)

(52) U.S. Cl.
CPC .............. *G06F 3/016* (2013.01); *G06F 3/0486* (2013.01); *G06F 3/04883* (2013.01); *G06F 3/04847* (2013.01); *G06F 2203/014* (2013.01)

(58) Field of Classification Search
USPC ....................................... 345/173
See application file for complete search history.

(56) References Cited

U.S. PATENT DOCUMENTS

| 2009/0167704 | A1 | 7/2009 | Terlizzi et al. |
| 2009/0322498 | A1 | 12/2009 | Yun et al. |
| 2010/0267424 | A1* | 10/2010 | Kim et al. ............... 455/566 |
| 2010/0299599 | A1* | 11/2010 | Shin et al. ............... 715/702 |
| 2011/0248916 | A1 | 10/2011 | Griffin et al. |
| 2011/0252362 | A1 | 10/2011 | Cho et al. |
| 2011/0283212 | A1 | 11/2011 | Warner |
| 2012/0081326 | A1 | 4/2012 | Heubel et al. |
| 2012/0110452 | A1* | 5/2012 | Hiipakka et al. ............... 715/716 |

* cited by examiner

*Primary Examiner* — Jonathan Boyd
(74) *Attorney, Agent, or Firm* — Birch, Stewart, Kolasch & Birch, LLP

(57) ABSTRACT

A display device and controlling method thereof are disclosed. The present invention includes displaying object on display unit, detecting contact with region of displayed object on display unit, detecting first touch input of dragging displayed object in top-bottom or right-left direction by maintaining contact, controlling object in direction of one-way control in response to first touch input, and generating tactile feedback on first touch input, wherein direction of one-way control is set up by initial drag direction of first touch input, wherein object is controlled to correspond to direction component of one-way control included in first touch input, and wherein when first touch input includes first drag performed in direction of one-way control and second drag performed in direction opposite to one-way control direction, tactile feedback on either first drag or second drag is generated.

21 Claims, 9 Drawing Sheets

APPARATUS AND METHOD FOR CONTROLLING DISPLAYED OBJECT AND TACTILE FEEDBACK

Pursuant to 35 U.S.C. §119(a), this application claims the benefit of earlier filing date and right of priority to Korean Application No. 10-2012-0135076, filed on Nov. 27, 2012, the contents of which are hereby incorporated by reference herein in their entirety.

BACKGROUND OF THE INVENTION

1. Field of the Invention

The present invention relates to a display device, and more particularly, to a mobile terminal and controlling method thereof. Although the present invention is suitable for a wide scope of applications, it is particularly suitable for controlling a user interface displayed by a user's touch input.

2. Discussion of the Related Art

Generally, a user is able to acquire various kinds of informations through a display device owing to the increasing rate in supplying display devices and a variety of digital contents. Since a display device provides a user with various digital contents through its screen, the user is able to use the provided contents without being bound by times or places.

A display device provides a scroll function to enable a lot of contents to be provided via a limited screen region. In particular, a user can be provided with a whole digital content through a limited screen region in a manner of scrolling or controlling a displayed content in top-to-bottom and/or right-to-left direction.

However, since a touch sensitive region for detecting a scroll or control action of a user in a display device is limited to a screen region, several touch inputs should be performed to check a digital content in large size. To this end, it is inconvenient for the user to perform many contacts/releases on the touch sensitive region repeatedly. Moreover, in case of a portable display device, if a contact with a touch sensitive region is released to perform a touch input several times, it is difficult for a user to stably grip the portable display device. Hence, the demand for a method of continuing to scroll or control a digital content with continuous touch inputs while stably gripping a display is rising.

SUMMARY OF THE INVENTION

Accordingly, embodiments of the present invention are directed to a display device and controlling method thereof that substantially obviate one or more problems due to limitations and disadvantages of the related art.

An object of the present invention is to provide a display device for providing a digital content and controlling method thereof, by which an object displayed on the display device can be controlled in predetermined direction in response to a touch input performed by a user continuously and repetitively.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a display device according to one embodiment of the present invention may include a display unit configured to display an object, a sensor unit configured to detect a contact with a region having the object displayed thereon and a first touch input of dragging the object displayed region in top-bottom or right-left direction by maintaining the contact from the display unit, a controller configured to display the object in a manner of controlling the object in a direction of a one-way control in response to the first touch input, and a tactile feedback unit configured to generate a tactile feedback on the first touch input, wherein the direction of the one-way control is set up by an initial drag direction of the first touch input, wherein the object is controlled to correspond to a direction component of the one-way control included in the first touch input, and wherein if the first touch input includes a first drag performed in the direction of the one-way control and a second drag performed in a direction opposite to the one-way control direction, the tactile feedback unit generates the tactile feedback on either the first drag or the second drag.

In another aspect of the present invention, a method of controlling a display device according to another embodiment of the present invention may include the steps of displaying an object on a display unit, detecting a contact with a region having the object displayed thereon from the display unit, detecting a first touch input of dragging the object displayed region in top-bottom or right-left direction by maintaining the contact, displaying the object in a manner of controlling the object in a direction of a one-way control in response to the first touch input, and generating a tactile feedback on the first touch input, wherein the direction of the one-way control is set up by an initial drag direction of the first touch input, wherein the object is controlled to correspond to a direction component of the one-way control included in the first touch input, and wherein if the first touch input includes a first drag performed in the direction of the one-way control and a second drag performed in a direction opposite to the one-way control direction, the tactile feedback on either the first drag or the second drag is generated.

In a further aspect of the present invention, a method of controlling a display device according to another embodiment of the present invention may include the steps of displaying an object on a display unit, detecting a contact with a region having the object displayed thereon from the display unit, detecting a first touch input of dragging the object in a first direction by maintaining the contact, controlling the object in the first direction in response to the first touch input, and generating a tactile feedback on the first touch input, wherein the first direction is set to a direction of a one-way control of the object, wherein the object is controlled in the direction of the one-way control only while the contact is maintained, and wherein if the first touch input includes a first drag performed in the direction of the one-way control and a second drag performed in a direction opposite to the one-way control direction, the tactile feedback on either the first drag or the second drag is generated.

Accordingly, the present invention provides the following effects and/or advantages.

First of all, a display device according to the present invention enables a displayed object to be scrolled in predetermined direction in response to a touch input repetitively performed by a user.

Secondly, the present invention enables a user to repetitively scroll a displayed object while gripping a display device stably.

Thirdly, a display device according to the present invention determines a direction for controlling a displayed object in response to a user's touch input, thereby displaying the object by controlling it in the determined direction only.

Fourthly, a display device according to the present invention detects an initial moving direction of a user's touch input to an object, thereby determining the detected direction as a control direction of the object.

Finally, a display device according to the present invention is able to control a function of a displayed object using a one-way control.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

Reference will now be made in detail to the preferred embodiments of the present invention, examples of which are illustrated in the accompanying drawings. And, the present invention is non-limited by the preferred embodiments of the present invention.

First of all, although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

A display device according to the present invention is able to provide a user interface to enable a user to control the display device. In particular, the user interface may include a visual interface visually provided to a user and a tactile interface provided to a user through tactile senses. The user interface may be able to display at least one object. And, the corresponding object may be able to deliver information to a user and/or perform a specific function. For instance, the object may include such a digital object having visual information as an e-book, a web content, a digital photo and the like. The object may include a control interface configured to control functions of the display device as well. In the following description, the display device may be able to detect a user's touch input. In particular, the user' touch input may be detected by at least one of a touch sensitive display unit, a display unit, a touch unit and a sensor unit.

A display device according to the present invention may include an electronic device configured to provide a user with a user interface by including a display unit. The display device may include at least one of a head mounted display (HMD), a notebook computer, a smart pad, a tablet PC (personal computer), a television set, a smart table, a smart phone, a personal digital assistant (PDA), a monitor, a cellular phone and an MP3 music player or may include an electronic device having a display unit.

Figure 1:
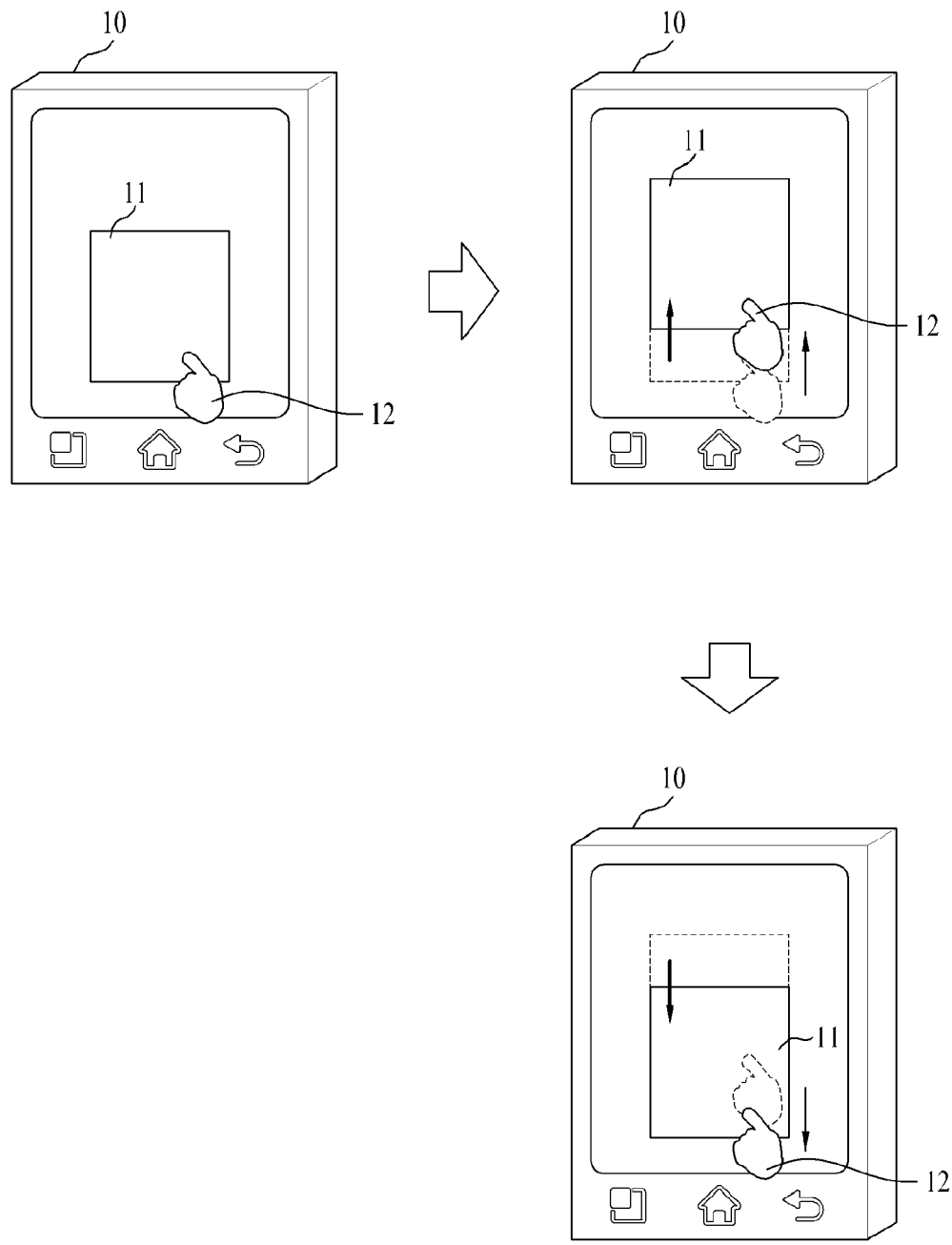
FIG. 1 is a diagram of an object controlled by a user's touch input according to one embodiment of the present invention.

FIG. 1 is a diagram of an object controlled by a user's touch input according to one embodiment of the present invention. A display device displays an object on a touch sensitive display unit. In particular, the display device may be able to display the object in a manner of controlling the object in response to a user's touch input of touching the object. In more particular, the display device is able to control the object by reflecting the user's touch input as it is.

Referring to FIG. 1, a display device 10 is able to display an object 11. The display device 10 may include at least one of a sensor unit configured to detect a user's touch input 12 of a touch to the displayed object 11 and a touch sensitive display unit. In this case, the user's touch input, as shown in FIG. 1, may include a first drag of dragging the object in top direction and a second drag of dragging the object in bottom direction.

After a user' finger has made a contact with the displayed object 11, if the first drag of dragging the object in top direction is inputted while the contact is maintained, the object 11 can be displayed in a manner of being shifted in top direction in accordance with the first drag. If the user inputs the second drag of dragging the object in bottom direction in continuation with the first drag while maintaining the contact, the object 11 may be displayed in a manner of being shifted in bottom direction in accordance with the second drag. Thus, as long as the contact between the user's finger and the touch sensitive display unit is maintained, the displayed object 11 can be displayed in a manner of being shifted in direction of the drag in response to the user's touch input. In particular, the display device is able to control the object by applying the inputted user's touch input thereto as it is.

Figure 2:
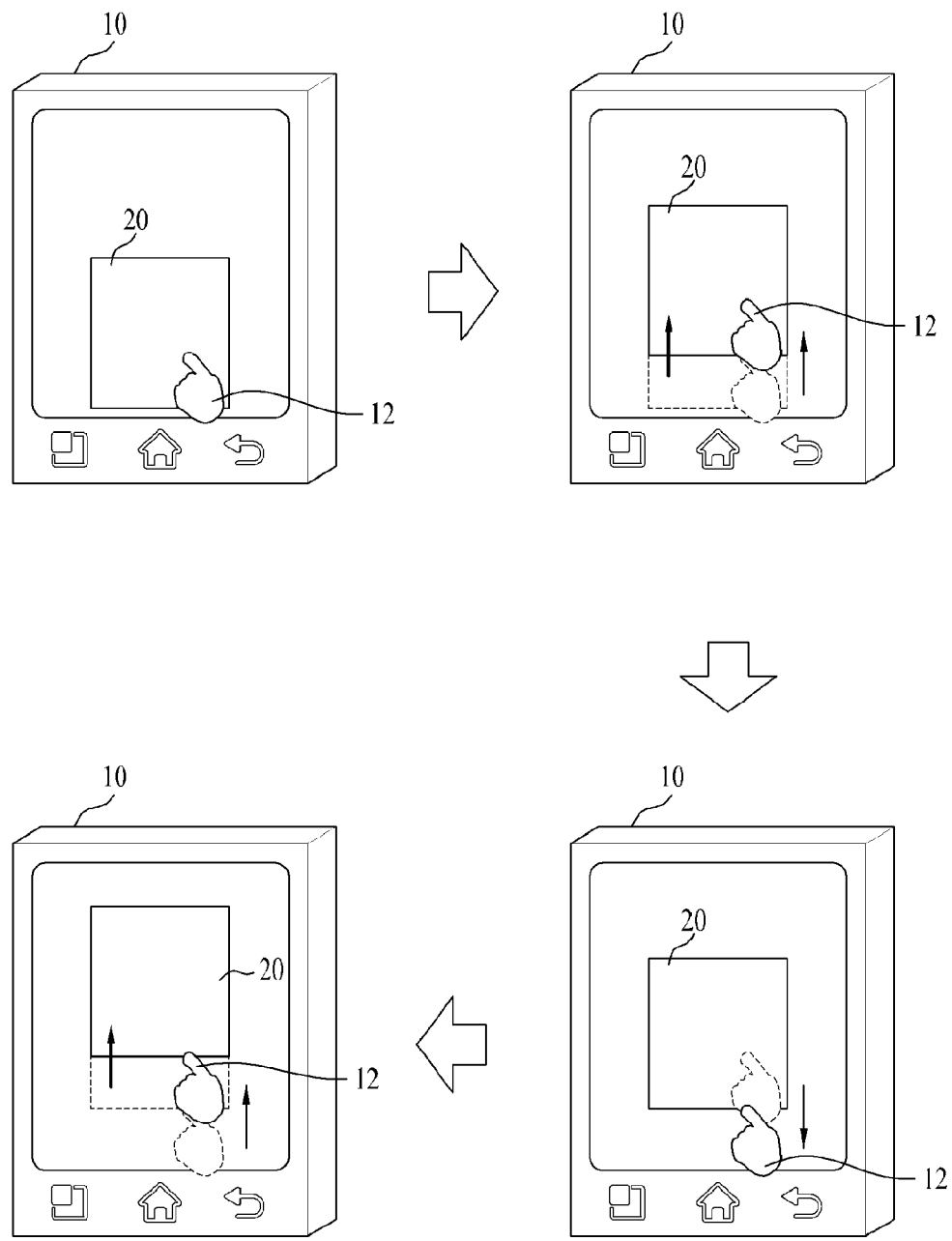
FIG. 2 is a diagram to describe a one-way control by a user's touch input according to one embodiment of the present invention.

FIG. 2 is a diagram to describe a one-way control by a user's touch input according to one embodiment of the present invention. A display device displays an object and is then able to apply a one-way control to the displayed object in response to a user's touch input of touching the corresponding object. The one-way control may be defined as a method of controlling an object by only applying a partial drag, which is a portion of a drag included in a touch input applied to the object, in direction of the one-way control. In the one-way control, a direction of the one-way control may be set up by an initial drag direction of a touch input after a user has touched an object or contacted a display unit. A display device may be able to control an object in response to a direction component of a one-way control included in an applied touch input. In setting up a direction of a one-way control, a display device according to an embodiment of the present invention is able to set up the direction of the one-way control in accordance with a direction of a partial drag initially performed over a preset distance in a whole drag included in a touch input. In particular, when a touch input includes a first drag and a second drag, if the first drag is performed in a distance smaller than a preset distance and the second drag is performed in a distance equal to or greater than the preset distance, a direction of a one-way control can be set up by a direction of the second drag.

Referring to a left top of FIG. 2, a display device 10 is able to display an object 20. A user is able to contact the displayed object 20 using a finger or stylus pen. Referring to a right top of FIG. 2, if the user inputs a first drag of dragging the object 20 in top direction while maintaining the contact with the object 20, the display device 10 may be able to display the object 20 in a manner of shifting the object 20 in the user's drag direction. In doing so, the display device 10 is able to determine a direction of the one-way control as a top direction corresponding to an initial drag direction of a touch input. As long as the contact between the user's finger or stylus pen and the object 20 is maintained, the display device 10 is able to maintain the determined direction of the one-way control. Hence, while the direction of the one-way control is maintained, the display device 10 is able to selectively apply a drag component of the user's touch input corresponding to the direction of the one-way control to the object 20. In doing so, the display device 10 is able to control the object in response to the drag component corresponding to the direction of the one-way control in the user's touch input.

Referring to a right bottom of FIG. 2, if the user inputs the second drag of dragging the object 20 in bottom direction while maintaining the contact with the object 20, the display device 10 may not apply the second drag to the object 20. In particular, despite the second drag, the display device 10 may enable a position of the object 20 to be maintained at a position to which the object 20 has been dragged by the first drag. Since a direction of the second drag of dragging the object in bottom direction is not the top direction of the one-way control direction determined by the first drag, the display device 10 may not control the object 20 in response to the second drag. In controlling the object 20, the display device 10 bypasses the second drag, thereby enabling a user to recognize that the second drag is not applied to the object 20.

Referring to a left bottom of FIG. 2, if the user inputs a third drag of dragging the object 20 in top direction while maintaining the contact with the object 20, the display device 10 may be able to display the object 20 by dragging the object 20 in top direction. Since a direction of the third drag is equal to the one-way control direction determined by the first drag, the display device 10 may be able to control the object 20 by applying the third object to the object 20.

The above-mentioned first to third drags may be continuously inputted by the user. If so, as mentioned in the foregoing description, the display device 10 determines a direction of the one-way control and is then able to control the object in one direction. In particular, the display device 10 is able to selectively apply a drag, which is performed in the same direction of the one-way control among a plurality of drags inputted while the contact with the object 20 is maintained, to the object 20. Moreover, the display device 10 is able to control the object 20 in response to a direction component of the one-way control included in the continuous drag.

For instance, the display device 10 is able to control the object 20 in a direction of the one-way control by detecting a drag, which is repeatedly performed by a user on an object displayed region in top and bottom directions while maintaining the contact with the object 20. If the user performs an initial drag in top direction, the display device 10 may be able to control the object 20 in the top direction each time an upward drag is inputted. If the user performs an initial drag in bottom direction, the display device 10 may be able to control the object 20 in the bottom direction each time a downward drag is inputted. In doing so, the display device 10 is able to control the object 20 in response to a drag component, which is included in the touch input repeatedly dragged in top and bottom directions, in the direction of the one-way control.

For another instance, the display device 10 is able to control the object 20 in a direction of the one-way control by detecting a drag, which is repeatedly performed by a user on an object displayed region in right and left directions while maintaining the contact with the object 20. If the user performs an initial drag in right direction, the display device 10 may be able to control the object 20 in the right direction each time a right drag is inputted. If the user performs an initial drag in left direction, the display device 10 may be able to control the object 20 in the left direction each time a left drag is inputted. In doing so, the display device 10 is able to control the object 20 in response to a drag component, which is included in the touch input repeatedly dragged in right and left directions, in the direction of the one-way control.

Figure 3:
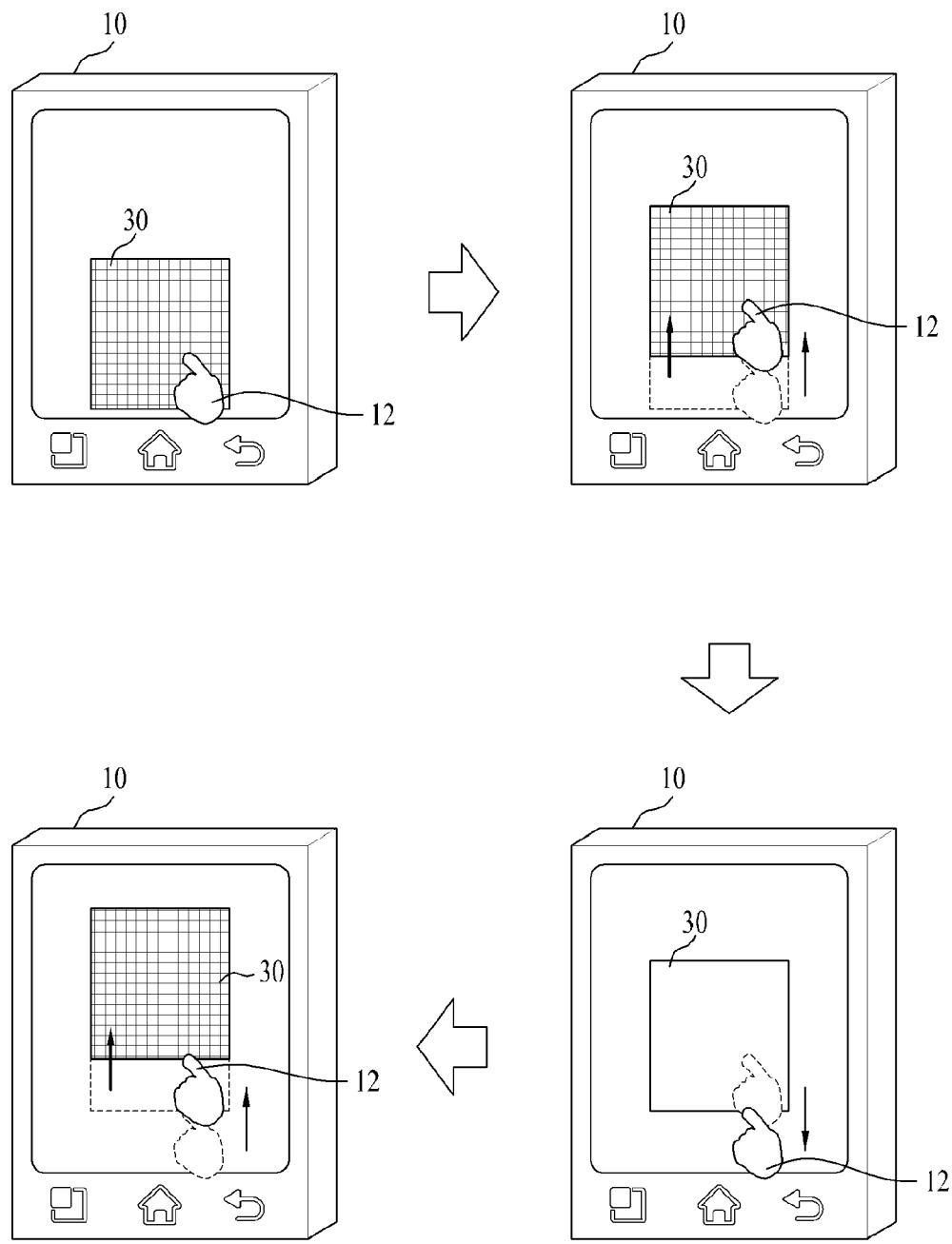
FIG. 3 is a diagram to describe a method of generating a tactile feedback in response to a one-way control according to one embodiment of the present invention.

FIG. 3 is a diagram to describe a method of generating a tactile feedback in response to a one-way control according to one embodiment of the present invention. A display device displays an object and is then able to apply a one-way control to the displayed object in response to a user's touch input of touching the displayed object. The touch input may include a plurality of drags. The one-way control may be defined as a method of controlling the drag only in direction of the one-way control in the touch input applied to an object. In the one-way control, the one-way control direction may be set up by an initial drag direction of the touch input applied after a user has touched the object or contacted a display unit. Once the direction of the one-way control is set up, the display device generates a tactile feedback when a drag in the one-way control direction is inputted. Alternatively, the display device may not generate a tactile feedback when a drag in direction opposite to the one-way control direction is inputted. On the contrary, when a drag in the one-way control direction is inputted, the display device may not generate a tactile feedback. When a drag in direction opposite to the one-way control direction is inputted, the display device may generate a tactile feedback. Through this, the display device is able to provide a user with a feedback, which indicates whether a direction of an inputted drag matches the one-way control direction using a presence or non-presence of the tactile feedback generation. Moreover, the user is able to recognize whether the object is controlled by a prescribed one of the drags without looking at the corresponding object using the tactile feedback. In the following description, when a drag in one-way control direction is inputted, a case of generating a tactile feedback is taken as an example.

Referring to a left top of FIG. 3, a display device 10 may be able to display an object 30 including a tactile feedback. If a user touches the object 30 with a finger 12 or a stylus pen, the display device 10 may be able to generate a tactile feedback. In doing so, the tactile feedback may be generated in response to an attribute of the displayed object 30. In particular, the tactile feedback may be generated to correspond to at least one of a material quality, texture, brightness, color and weight sense of the object 30. For instance, in case that the object 30 has a smooth texture, a generated tactile feedback may be set to have a low intensity or low frictional coefficient. On the contrary, in case that the object 30 has a rough texture, the generated tactile feedback may be set to have a high intensity or a high frictional coefficient.

Referring to a right top of FIG. 3, if a user inputs a first drag of dragging the object 30 in top direction while maintaining the contact with the object 30, the display device 10 may be able to display the object 30 in a manner of shifting the object 30 in direction of the user's drag. In doing so, the display device 10 may be able to determine a direction of a one-way control over the object 30 as an upward direction corresponding to the initial drag direction of the touch input. As long as the contact between the user's finger or the stylus pen and the object 30 is maintained, the display device 10 may be able to maintain the determined direction of the one-way control. Hence, while the direction of the one-way control is maintained, the display device 10 may be able to selectively apply the drag, which corresponds to the direction of the one-way control, in the user's touch input to the object 30. When the user inputs the drag corresponding to the direction of the one-way control, the display device 10 may be able to generate a tactile feedback. As mentioned in the foregoing description, the display device 10 may be able to generate a tactile feedback in response to an attribute of the controlled object.

Referring to a right bottom of FIG. 3, if the user inputs a second drag of dragging the object 30 in bottom direction while maintaining the contact with the object 30, the display device 10 may not apply the second drag to the object 30. In particular, despite the second drag, the display device 10 may be able to keep a position of the object 30 staying at a position to which the object 30 has been dragged by the first drag. Since a direction of the second drag of dragging the object in bottom direction is not the top direction corresponding to the one-way control direction determined by the first drag, the display device 10 may not control the object 30 in response to the second drag. Due to the same reason, the display device 10 may not generate a tactile feedback in response to the second drag. Therefore, in controlling the object 30, the display device 10 bypasses the second drag and does not generate the tactile feedback in response to the second drag, thereby enabling the user to recognize that the second drag is not applied to the object 30.

Referring to a left bottom of FIG. 3, if the user inputs a third drag of dragging the object 30 in top direction while maintaining the contact with the object 30, the display device 10 may be able to display the object 30 in a manner of shifting the object 30 in the top direction. And, the display device 10 may be able to generate the tactile feedback having been generated in response to the first drag. Since the direction of the third drag is equal to the one-way control direction determined by the first drag, the display device 10 controls the object 30 by applying the third drag to the object 30 and is able to generate a tactile feedback to the user.

The display device 10 may control the object 30 selectively using a drag corresponding to the one-way control direction among a plurality of drags inputted continuously and may be able to selectively generate a tactile feedback in response to the drag corresponding to the one-way control direction. Therefore, the user is able to recognize that a prescribed drag in prescribed direction among a plurality of the drags continuously inputted by the user is used to control the object 30.

Figure 4:
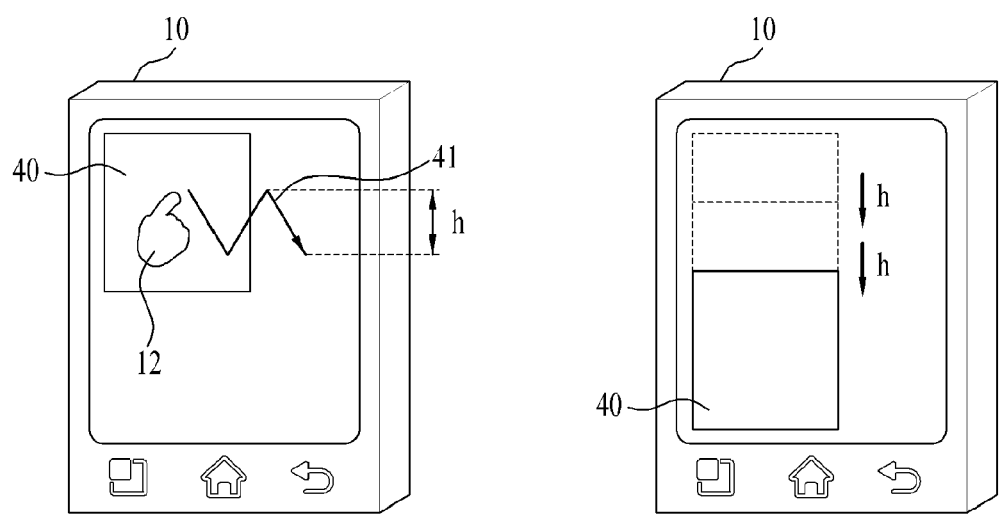
FIG. 4 is a diagram to describe a method of controlling an object in a one-way control and a method of generating tactile feedback according to another embodiment of the present invention.
Figure 4:
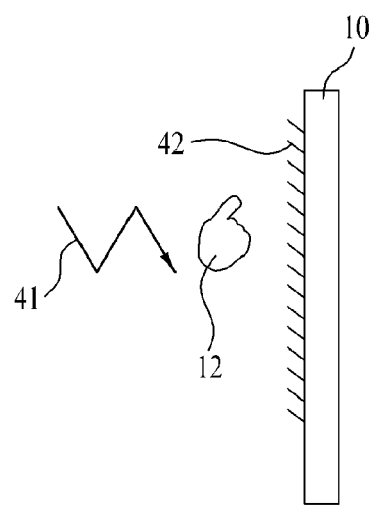

FIG. 4 is a diagram to describe a method of controlling an object in a one-way control and a method of generating tactile feedback according to another embodiment of the present invention.

Referring to FIG. 4, a display device 10 detects a user's touch input and may be then able to generate a tactile feedback in response to the detected touch input. In particular, the display device 10 may be able to generate a different tactile feedback in accordance with a direction of each of a plurality of inputted drags included in the touch input. When a drag is inputted in direction of a one-way control, the display device 10 may generate a first tactile feedback. When a drag is inputted in direction different from that of the one-way control, the display device 10 may be able to generate a second tactile feedback.

The user may be able to control an object 40 displayed on a display unit by touching a touch sensitive display unit with a finger 12 or a stylus pen. In applying a touch input to the object 40, the user may be able to input a plurality of drags in zigzag form, as shown in a left top of FIG. 4, as well as in top, bottom, right and left directions. For instance, a user's touch input 41 applied in the zigzag form shown in FIG. 4 may include a first drag in right-bottom direction, a second drag in right-top direction and a third drag in right-bottom direction. If directions of controlling the object 40 are limited, the display device only extracts a component of a limited direction for controlling the object 40 from the initial drag direction and may be then able to set a direction of a one-way control to the extracted component of the limited direction. Hence, the display device 10 may be able to control the object 40 using the component of the one-way control direction in the user's touch input 41 applied in the zigzag form only. For instance, if the object 40 displayed on the display unit is set to be controlled in top and bottom direction, the display device 10 may be able to set the direction of the one-way control to a bottom direction by excluding the right direction from the right-bottom direction that is the initial drag direction of the user's input 41 applied in the zigzag form. The display device 10 may be able to control the object 40 using the component corresponding to the one-way control direction set up in the above for the user's touch input 41 applied in the zigzag form.

The display device 10 is able to extract the downward component corresponding to the one-way control direction from the first drag performed in the right-bottom direction only. Hence, the display device 10 may be able to control the object using a downward drag component, which has a length h, corresponding to the downward component of the first drag. Hence, referring to a right top of FIG. 4, the object 40 can be displayed in a manner of being shifted in the bottom direction by the length h.

Subsequently, the display device 10 may be able to extract a downward component corresponding to the one-way control direction from the second drag performed in the right-top direction. In this case, since the second drag is performed in the right-top direction, it does not contain the downward component corresponding to the direction of the one-way control. Hence, the display device 10 may be able to keep the object 40 at the position shifted by the first drag without shifting the object 40 in response to the second drag.

Subsequently, the display device 10 is able to extract the downward component corresponding to the one-way control direction from the third drag performed in the right-bottom direction only. Hence, the display device 10 may be able to control the object using a downward drag component, which has a length h, corresponding to the downward component of the third drag. Hence, referring to a right top of FIG. 4, the object 40 can be displayed in a manner of being further shifted in the bottom direction by the length h.

A tactile feedback is described as follows. First of all, if a user touches the displayed object 40, the display device 10 may be able to provide the user with a tactile feedback corresponding to an attribute of the object 40. The display device 10 may be able to generate a different tactile feedback in a manner of discriminating one case that a component of a direction of a one-way control is included in a user's touch input from the other case that the component of the direction of the one-way control is not included in the user's touch input. In case that the component of the direction of the one-way control is included in the user's touch input, the display device 10 may be able to generate a first tactile feedback. In case that the component of the direction of the one-way control is not included in the user's touch input, the display device 10 may be able to generate a second tactile feedback. For instance, referring to a bottom part of FIG. 4, the display device 10 may be able to generate a tactile feedback on a texture 42 having directionality. The bottom part of FIG. 4 is a lateral diagram of the display device 10. A wood grain may be taken as an example of the above-mentioned texture 42 having the directionality. When the user applies a touch in direction opposite to that of a grain of wood, assume that a frictional force between the wood and a user's hand is named a first frictional force. When the user applies a touch in direction equal to that of the grain of wood, assume a frictional force between the wood and the user's hand is named a second frictional force. Hence, the first frictional force will be relatively greater than the second frictional force in general. Similarly, referring to the bottom part of FIG. 4, the display device 10 may be able to generate a tactile feedback on the texture 42 having directionality on a surface of the display device 10. If the user performs a drag in backward direction on the texture having the directionality, the display device 10 may be able to generate a first tactile feedback. If the user performs a drag in forward direction on the texture 42 having the directionality, the display device 10 may be able to generate a second tactile feedback. In this case, the first tactile feedback may have a frictional force greater than that of the second tactile feedback.

In the above-described example, if a component of the one-way control direction is contained in a user's drag, the display device 10 generates the first tactile feedback having a relatively great frictional force. If the component of the one-way control direction is not contained in the user's drag, the display device 10 generates the second tactile feedback having a relatively small frictional force. Yet, according to a prescribed embodiment, if a component of the one-way control direction is contained in the user's drag, the display device 10 may generate the second tactile feedback having a relatively small frictional force. If the component of the one-way control direction is not contained in the user's drag, the display device 10 may generate the first tactile feedback having a relatively great frictional force.

Moreover, if a component of the one-way control direction is contained in a user's drag, the display device may generate a first tactile feedback having a first intensity. If the component of the one-way control direction is not contained in the user's drag, the display device 10 may generate a second tactile feedback having a second intensity. In particular, the display device 10 may be able to generate a tactile feedback corresponding to a drag having a component of the one-way control direction or a tactile feedback corresponding to a drag not having the component of the one-way control direction in a manner of adjusting an intensity of the tactile feedback having the same texture.

Figure 5:
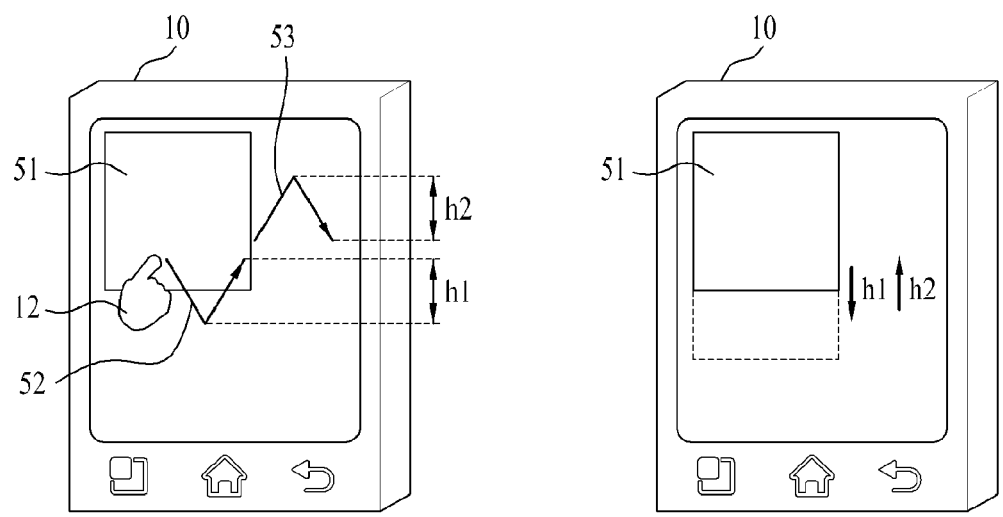
FIG. 5 is a diagram to describe a one-way control in response to a plurality of discontinuous touch inputs according to one embodiment of the present invention.

FIG. 5 is a diagram to describe a one-way control in response to a plurality of discontinuous touch inputs according to one embodiment of the present invention. A display device may be able to maintain a one-way control direction for a continuous touch input. The display device may be able to maintain the established one-way control direction until the continuous touch input ends. After the touch input has ended, the display device may be able to rest the one-way control direction. Hence, in case that a discontinuous touch input is applied, the display device resets the established one-way control direction and then sets up the one-way control again.

In FIG. 5, a displayed object 51 may be assumed as controllable in to and bottom directions. Referring to FIG. 5, a display device 10 may be able to detect a first touch input 52 performed in a manner of dragging the displayed object 51 in right-bottom direction and then dragging the displayed object 51 in right-top direction. And, the display device 10 may be able to detect a second touch input 53 applied in a manner of being discontinuous from the first touch input 52. In this case, the second touch input may include an action of dragging the displayed object 51 in right-top direction and then dragging the displayed object 51 in right-bottom direction. The display device 10 may be able to set a direction of a one-way control to a downward direction for the first touch input 52 having an initial drag direction set to the right-bottom direction. This is because the direction for controlling the object is limited to the top-bottom direction. The display device 10 may be able to control the displayed object 51 in the direction of the one-way control. In particular, referring to a right part of FIG. 5, the display device 10 may be able to display the object 51 in a manner of shifting the object 51 in bottom direction by a length h1 corresponding to a component of the one-way control direction in response to a user's action of dragging the object 51 in the right-bottom direction. Since the component of the one-way control direction is not contained, the display device 10 may not shift the object 51 in response to an action of the drag performed in the right-top direction contained in the first touch input 52. In particular, the display device 10 may be able to maintain the object at a position to which the object 51 has been shifted by the former action of the drag performed in the right-bottom direction. If the first touch input 52 ends, the display device 10 may be able to rest the one-way control direction set to the bottom direction.

The display device 10 may be able to reset the top direction to the one-way control direction for the second touch input 53 having the initial drag direction set to the right-top direction. The display device 10 may be able to control the displayed object 51 in the direction of the one-way control. In particular, referring to the right part of FIG. 5, the display device 10 may be able to display the object 51 in a manner of shifting the object 51 in top direction by a length h2 corresponding to the component of the one-way control direction in response to the user's action of dragging the object 51 in the right-top direction. Since the component of the one-way control direction is not contained, the display device 10 may not shift the object 51 in response to the action of dragging the object 51 in the right-bottom direction. In particular, the display device 10 may be able to maintain the object 51 at the position to which the object 51 has been shifted by the former action of dragging the object 51 in the right-top direction. If the second touch ends 53, the display device 10 may be able to rest the one-way control direction set to the top direction.

Thus, the display device 10 may be able to maintain the established one-way control direction in response to a continuous touch input. And, the display unit 10 may be able to rest the established one-way control direction in response to a discontinuous touch input. In particular, a user is able to continuously shift an object by repeatedly dragging the object while maintaining a contact with a display device and is also able to reset a direction of a one-way control by releasing the contact with the display device.

Figure 6:
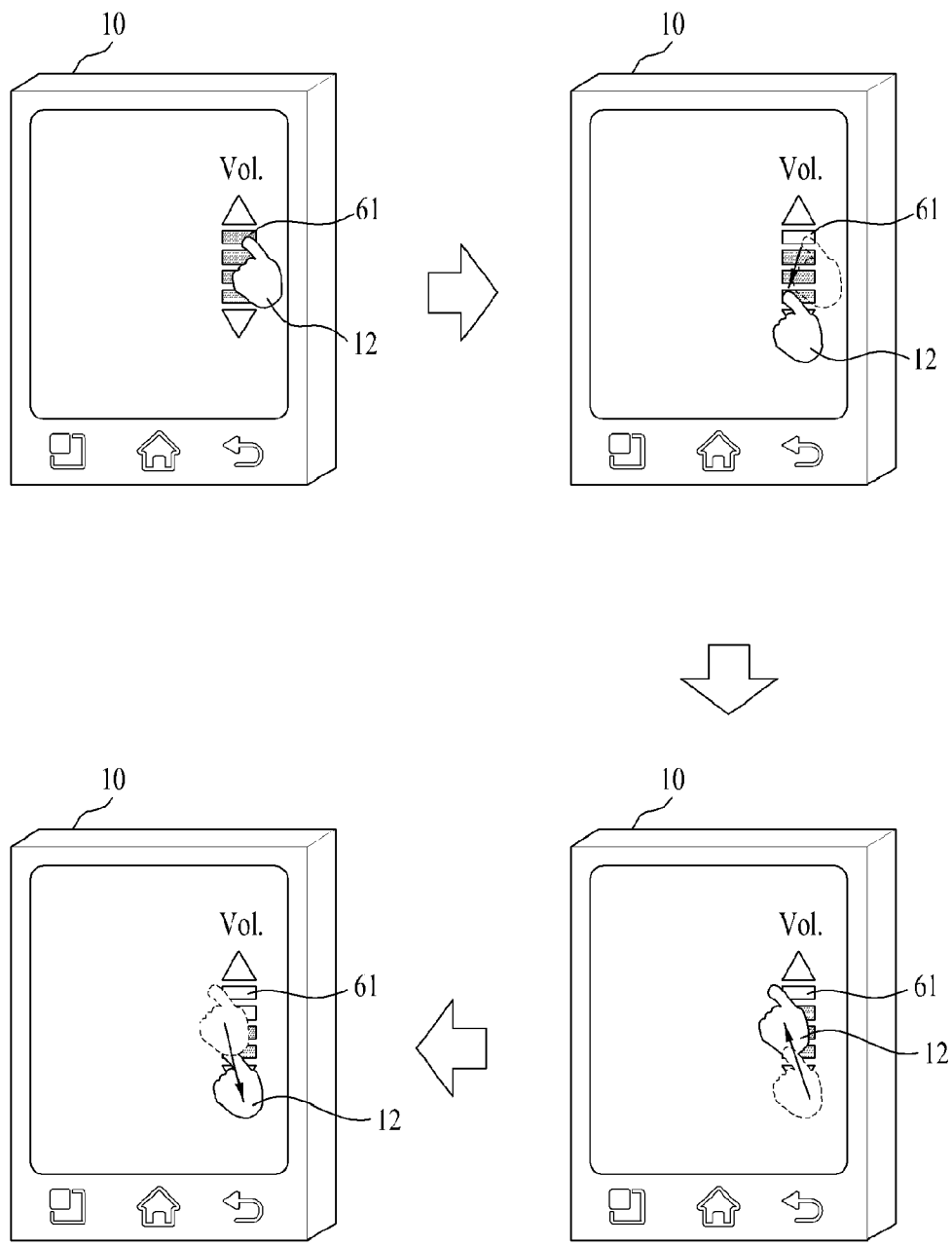
FIG. 6 is a diagram to describe a method of controlling an object using a one-way control according to one embodiment of the present invention.

FIG. 6 is a diagram to describe a method of controlling an object using a one-way control according to one embodiment of the present invention. A display device may be able to control a non-shiftable using a one-way control as well as a shiftable object. The display device is able to control a function of a non-shiftable object using the one-way control for the corresponding object. In this case, the non-shiftable object may include a control interface configured to control settings of the display device. FIG. 6 shows a one-way control method of controlling a non-shiftable object or a control interface. The display device is able to control a function of a control interface using a one-way control. The display device is able to set up a direction of the one-way control in response to an initial drag direction of a user. When a first touch input includes a first drag performed in direction of the one-way control and a second drag performed in direction opposite to the one-way control direction in continuation with the first drag, the display device may control a function of the control interface in the one-way control direction in response to the first drag or may not control the function of the control interface in response to the second drag. Moreover, the display device may be able to control a function of an object to correspond to a dragged length of the first drag.

Referring to FIG. 6, for instance, the display device may be able to display a volume control interface 61. Referring to a left top part of FIG. 6, a volume is set to Level 4. Referring to a right top part of FIG. 6, if a user performs a drag in bottom direction using a finger 12 or a stylus pen, the display device may be able to set the direction of the one-way control to the bottom direction. And, the display device may be able to lower the volume by one step in response to a user's downward drag by controlling the volume control interface 61. In particular, the display device is able to set the volume to Level 3. Subsequently, referring to a right bottom part of FIG. 6, the user is able to perform a drag in top direction while maintaining the contact with display device. Since a component of the one-way control direction is not contained in the user's upward drag, the display device may be able to bypass the user's upward drag without controlling the volume control interface 61. In particular, the display device may be able to maintain the volume at Level 3. Subsequently, referring to a left bottom of FIG. 6, the user may be able to perform a drag in bottom direction again while maintaining the contact with the display device. Since the component of the one-way control direction is contained, the display device is able to control the volume control interface in response to the user's downward drag. In particular, the display device is able to lower the volume down to Level 2.

The display device may be able to control the volume control interface to correspond to a length of a user's drag. For instance, in the example mentioned in the above description, if the user performs a short drag in the one-way control direction, a volume level may be changed by one step. If the user performs a long drag in the one-way control direction, the volume level may be changed by 2 steps.

As mentioned in the foregoing description, the display device may be able to control a non-shiftable object as well. The display device may be able to control an object or a function of a control interface through the one-way control. Although the volume control interface is taken as an example for the above description, the one-way control may be applicable to such a control interface as a channel control interface, a playback control interface, a menu select interface and the like. The display control may be able to control channels of the display device by applying the one-way control to the channel control interface. The display device may be able to control a play operation of a content currently played in the display device by applying the one-way control to the playback control interface. And, the display device may enable a user to select and activate various menus provided by the display device by applying the one-way control to the menu select menu.

Figure 7:
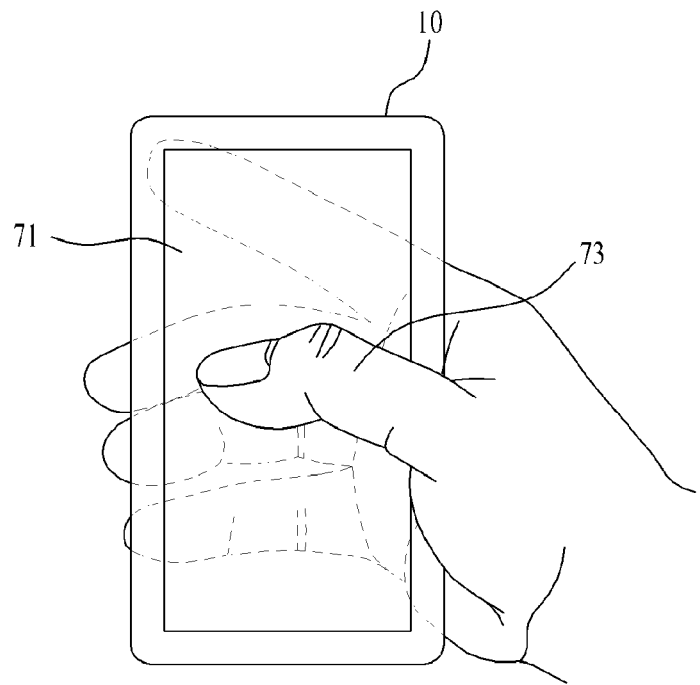
FIG. 7 is a diagram to describe a method of applying a one-way control to a rear side touch unit according to one embodiment of the present invention.
Figure 7:
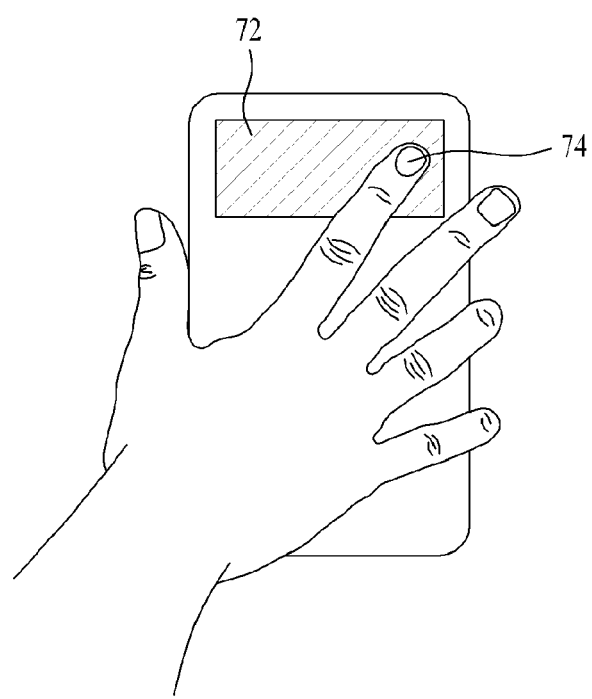

FIG. 7 is a diagram to describe a method of applying a one-way control to a rear side touch unit according to one embodiment of the present invention.

Referring to FIG. 7, a one-way control may be applicable to a display device having touch units provided to both sides, respectively. In particular, the display device 10 may include a front side touch unit 71 and a rear side touch unit 72. The front side touch unit 71 and the rear side touch unit 72 may include a front side touch sensitive display unit and a rear side touch sensitive display unit. Referring to FIG. 7, in order to control the display device, a user grips a rear side of the display unit with 4 fingers and may be then able to apply a touch input to the front touch unit 71 provided to a front side of the display unit using a thumb 73. Hence, the user is able to contact the front side touch unit more easily rather than the gripped rear side touch unit 72 and is then able to release the corresponding contact. Hence, the user is able to control the object in a manner of repeatedly performing a contact and release on the touch unit. As mentioned in the foregoing description with reference to FIG. 1, as long as the contact between the user's finger and the touch unit or the display unit is maintained, the display unit may be able to control a displayed object in direction of a drag of a user's touch input. In particular, the display device does not apply the one-way control to the front side touch unit 71 for facilitating the contact and release in aspect of the user but is able to control an object by following the direction of the drag performed with a user's finger.

As mentioned in the foregoing descriptions with reference to FIGS. 2 to 6, the one-way control is applicable to one of the touch units, and more particularly, to the rear side touch unit 72. Referring to FIG. 7, the rear side of the display device 10 may become a target to be supported with finger in order for a user to grip the display device 10. A user's finger 74 may be able to support the display device 10 in direction opposite to gravity direction by contacting the rear side of the display device 10. Hence, while the user is controlling the object through the rear side touch unit 72 provided to the rear side of the display device 10, if the user releases the contact from the rear side touch unit 72, it may be difficult to grip the display device 10 stably and safely.

In order to provide a user with a stable and safe grip, the display device 10 may be able to apply the one-way control to the rear side touch unit 72. Therefore, in order to continuously control a displayed object in the one-way control direction, the user needs not to release the finger 74 from the rear side touch unit 72. By applying the one-way control to the rear side touch unit 72, the display device 10 may be able to repeatedly control the object in the one-way control direction without releasing the contact from the rear side touch unit 72. Through this, the user is able to control the displayed device in a user-desired direction of the one-way control through the rear side touch unit 72 while gripping the display device 10 stably and safely.

As mentioned in the foregoing description, the display device 10 is able to apply different touch control methods to the front side touch unit 71 and the rear side touch unit 72, respectively. According to the description of the above example, the display device applies the control of enabling the front side touch unit 71 to exactly reflect a touch input is applied to the front side touch unit 71 and also applies the one-way control to the rear side touch unit 72. Yet, according to another embodiment, the display device 10 may apply the one-way control to the front side touch unit 71 and may also apply the control of enabling the rear side touch unit 72 to exactly a touch input to the rear side touch unit 72.

Figure 8:
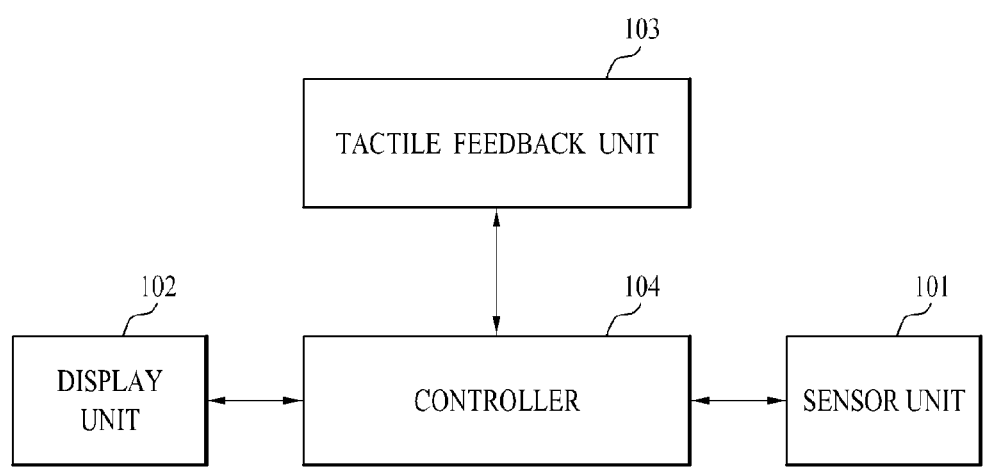
FIG. 8 is a block diagram of a display device according to one embodiment of the present invention.

FIG. 8 is a block diagram of a display device according to one embodiment of the present invention.

Referring to FIG. 8, a display device may include a sensor unit 101, a display unit 102, a tactile feedback unit 103 and a controller 104.

The sensor unit 101 detects a user's touch input using a plurality of sensors loaded on the display device and may be then able to deliver the detected user's input to the controller 104. In this case, the sensor unit 101 may be called a touch unit. And, the user's touch input may include a plurality of drags. The sensor unit 101 may be able to include a plurality of sensing means. For one example, a plurality of the sensing means may include a piezoelectric sensor, a motion sensor, a touch sensor and the like. According to the present invention, at least one of the piezoelectric sensor, the motion sensor and the touch sensor may be able to detect a user's touch input. The touch sensor may include at least one of a depressurizing touch sensor and an electrostatic touch sensor. The display device may be able to detect a touch input performed in a manner of selecting an object and then dragging the selected object using the sensor unit 101 and may be also able to detect a direction of the touch input. The sensor unit 101 may be able to detect an initial drag direction of a touch input in response to a user's touch input and may be then able to deliver information on the detected initial drag direction of the touch input to the controller 104. Subsequently, the controller 104 sets up a direction of a one-way control based on the information on the initial drag direction of the touch input and may be able to apply the one-way control to an object controlled by the user's touch input. The sensor unit 101 is a general name of the above-mentioned various sensing means. The sensor unit 101 detects touch inputs having various properties and may be then able to deliver the sensing results of the detected touch inputs to enable the display device to perform corresponding operations, respectively. The above-mentioned sensors may be included as separate elements in the display device or may be included in the display device in a manner of being integrated into at least one element.

The display unit 102 may be able to display an object on a display screen. In case that the display unit 102 includes a touch sensitive display unit, it may be used as the above-mentioned sensor unit 101. Hence, the display unit 102 may be able to detect a user's touch input to itself and may be then able to deliver information on the detected user's input to the controller 104. The display unit 102 may be able to play a role in displaying an object or image on a display panel or controlling an image display. The display unit 102 displays an object thereon and may be able to detect a user's touch input. Moreover, the display unit 102 is combined with the above-mentioned tactile feedback unit 103 and may be then able to provide a user with a tactile feedback. Besides, the display unit 102 may include a flexible display.

The tactile feedback unit 103 may be able to generate a tactile feedback to correspond to at least one of an attribute of a displayed object and a direction of a user's touch input. When the tactile feedback unit 103 generates the tactile feedback to correspond to the direction of the user's touch input, the tactile feedback input 103 may be able to determine whether the tactile feedback is generated or determine a type of the generated tactile feedback depending on whether a component of the one-way control direction set up by the controller 104 is contained in the user's touch input.

The tactile feedback unit 103 may be able to provide a tactile feedback on a user's finger or stylus pen, with which the display unit is touched, using a microscopic or ultrasonic vibration actuator. The tactile feedback unit 103 may be able to adjust at least one of a vibration frequency and a vibration amplitude, thereby being able to adjust a frictional force between the user's finger and the display unit. Moreover, the tactile feedback unit 103 generates a micro-current from the display unit and is then able to provide a tactile feedback to a user. The tactile feedback unit 103 may be able to adjust the intensity of an electric current and the generated period of the electric current, whereby the user is able to feel a different tactile sense. The tactile feedback unit 103 may be able to provide a tactile feedback using ultrasonic resonance. In particular, the tactile feedback unit 103 generates a plurality of ultrasonic waves, enables them to resonate in a specific region, and is then able to provide the tactile feedback to a user. And, the tactile feedback unit 103 is able to provide a different tactile feedback by adjusting a resonant frequency and a period of generating resonance.

The tactile feedback unit 103 may be able to generate a tactile feedback by comparing the one-way control direction set up by the controller 104 and a drag direction of a user's touch input with each other. If a component of the one-way control direction is contained in the user's touch input, the tactile feedback unit 103 may generate the tactile feedback. If the component of the one-way control direction is not contained in the user's touch input, the tactile feedback unit 103 may not generate the tactile feedback. In particular, only if the component of the one-way control direction is contained in the user's touch input, the tactile feedback unit 103 is able to generate the tactile feedback selectively. Alternatively, if the component of the one-way control direction is contained in the user's touch input, the tactile feedback unit 103 may generate a first tactile feedback. If the component of the one-way control direction is not contained in the user's touch input, the tactile feedback unit 103 may generate a second tactile feedback. A frictional force between the user's finger and the display unit in response to the first tactile feedback may exceed a frictional force between the user's finger and the display unit in response to the second tactile feedback. Alternatively, according to a prescribed embodiment, the frictional force between the user's finger and the display unit in response to the second tactile feedback may exceed a frictional force between the user's finger and the display unit in response to the first tactile feedback.

The controller 104 controls the sensor, display and tactile feedback units mentioned in the above description and may be able to manage and control data transactions among the units. The controller 104 receives information on a user's touch input of dragging a displayed object and may be then able to set up a direction of the one-way control. In particular, the controller 104 may be able to set the direction of the one-way control to an initial drag direction of the user's touch input to the object. If directions of controlling the object are limited, the controller 104 extracts a component of the limited direction of controlling the object from the initial drag direction and is then able to set the direction of the one-way control to the extracted component.

Once the direction of the one-way control is set up, the controller 104 may be able to apply the one-way control to the object. Regarding the one-way control applied object, if the component of the direction of the one-way control is included in the user's touch input for controlling the object, the controller 104 may be able to control the object in accordance with the touch input. On the contrary, if the component of the direction of the one-way control is not included in the user's touch input for controlling the object, the controller 104 bypasses the user's touch input and may not control the object.

While the contact between the user and the display unit 102 is maintained, the controller 104 may be able to maintain the established one-way control direction. When the contact is released, the controller 104 may be able to rest the established direction of the one-way control. In particular, the controller 104 may be able to reset the direction of the one-way control in accordance with an initial drag direction of a touch input applied after the completion of the contact release.

FIG. 8 is the block diagram to show one embodiment of the present invention. In FIG. 8, the separately displayed blocks represent elements of the display device in a manner that the elements are logically discriminated from one another. Therefore, the elements of the display device may be loaded as one chip or a plurality of chips in accordance with a design of the display device.

Figure 9:
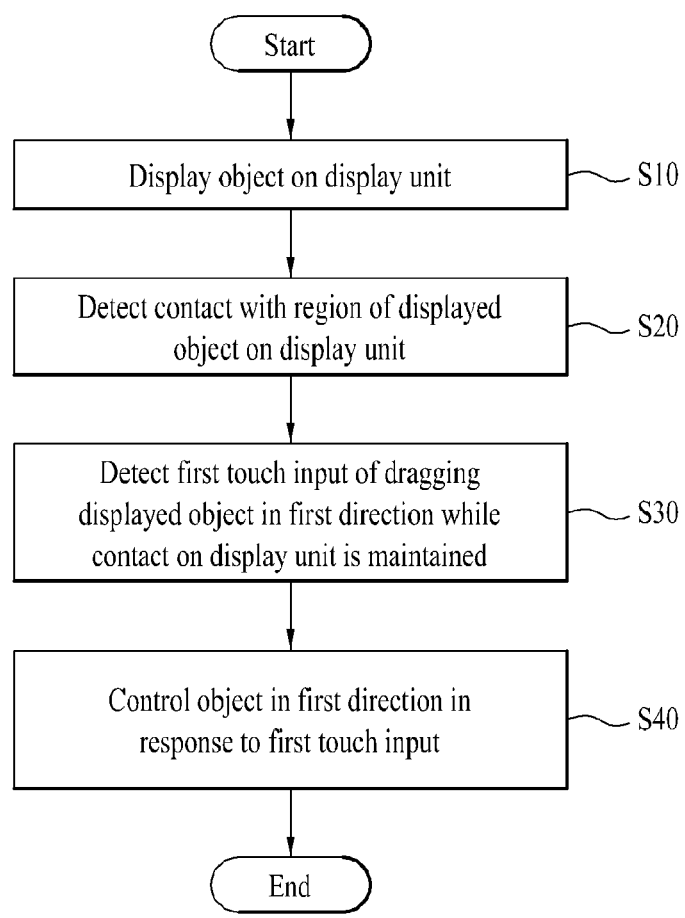
FIG. 9 is a flowchart for a one-way control method according to one embodiment of the present invention.

FIG. 9 is a flowchart for a one-way control method according to one embodiment of the present invention.

Referring to FIG. 9, as mentioned in the foregoing descriptions with reference to FIGS. 1 to 6, a display device may be able to display an object on a display unit [S10]. The object displayed on the display unit may include a position shiftable object or a position non-shiftable object. The object may include at least one of a picture, a document, a photo, a chart, a video and the like. And, the object may include a content provided by an application activated in the display device. Moreover, the object may include a user interface configured to control the display device. For instance, the object may include at least one of a volume control interface, a channel control interface, a playback control interface, a menu select interface and the like.

The display device may be able to detect a user's contact with a region in which the object is displayed on the display unit [S20]. In particular, the display device may be able to detect a user's touch input using a sensor unit or a display unit. A user may touch the display unit to control the object displayed on the display unit. As mentioned in the foregoing descriptions with reference to FIGS. 2 to 6, the display device may be able to detect the contact of a user's finger or stylus pen with the display unit. Until the detected contact is released, the display device may be able to maintain a direction of a one-way control that will be set up in the following step. Once the contact is released, the display device may be able to reset the direction of the one-way control.

The display device may be able to detect a first touch input of dragging the object displayed region in to-bottom directions or right-left directions repeatedly while maintaining the contact [S30]. In particular, the display device may be able to detect the first touch input applied continuously while maintaining the contact after the initial contact. As mentioned in the foregoing descriptions with reference to FIGS. 2 to 6, the display device may be able to detect the first touch input applied in zigzag form as well as top-bottom or right-left form. The display device may be able to set a direction of the one-way control to an initial drag direction of the first touch input. For instance, when a user repeatedly drags the displayed object in top-bottom directions using the first touch input, if the user's initial drag direction is the top direction, the display device may set the direction of the one-way control to the top direction. If the user's initial drag direction is the bottom direction, the display device may set the direction of the one-way control to the bottom direction. For another instance, when a user repeatedly drags the displayed object in right-left directions using the first touch input, if the user's initial drag direction is the right direction, the display device may set the direction of the one-way control to the right direction. If the user's initial drag direction is the left direction, the display device may set the direction of the one-way control to the left direction. According to the above-described examples, the user performs the drag in the top-bottom directions or the right-left directions. And, the one-way control may be applicable to a combination of the top-bottom and right-left directions.

In setting up the initial drag direction of the first touch input, the display device may be able to set up the initial drag direction in accordance with a direction of the drag initially performed in a distance equal to or greater than a preset distance among the drags included in the first touch input.

The display device may be able to display the object in a manner of controlling the object in the direction of the one-way control in response to the first touch input [S40]. As mentioned in the foregoing descriptions with reference to FIGS. 2 to 6, the display device may be able to control the object in the direction of the one-way control in response to the first touch input. In case that a control target is a shiftable object, the display device may be able to display the corresponding object in a manner of shifting a displayed position of the corresponding object. In case that a control target is a non-shiftable object, the display device may be able to display the corresponding object in a manner of changing an attribute of the corresponding object. Moreover, the display device may be able to change its settings in the course of controlling an object. For instance, the display device may be able to control a volume of the display device while changing an attribute of a volume control interface in response to a user's touch input. The display device may be able to control an object to correspond to a component of the one-way control direction included in the first touch input. In particular, in case that a plurality of drag actions respectively performed in a plurality of directions are included in the first touch input, the display device may be able to control an object in response to the drag action containing the component of the one-way control direction. On the other hand, the display device may bypass the drag action failing to contain the component of the one-way control direction. And, the display device may be able to control an object to correspond to the one-way control direction component included in the first touch input.

Subsequently, as mentioned in the foregoing descriptions with reference to FIG. 3 and FIG. 4, once the direction of the one-way control is established, when the drag in the one-way control direction is inputted, the display device may generate a tactile feedback. When the drag in direction opposite to the one-way control direction is inputted, the display device may not generate a tactile feedback. For another instance, when the drag in the one-way control is inputted, the display device may not generate a tactile feedback. When the drag in direction opposite to the one-way control direction is inputted, the display device may generate a tactile feedback. Through this, the display device may be able to feed back an information, which indicates whether the direction of the inputted drag matches the direction of the one-way control, to a user using a presence or non-presence of an occurrence of the tactile feedback. Moreover, even if the user does not look at the object, the user may be able to use the tactile feedback to recognize whether the object is controlled by a prescribed drag.

The display device detects whether the component of the one-way control direction is included in an inputted drag and may be then able to output a different tactile feedback in accordance with a result of the detection. In particular, when a drag in the one-way control direction is inputted, the display device may generate a first tactile feedback. When a drag in direction opposite to the one-way control direction is inputted, the display device may generate a second tactile feedback. In particular, the first tactile feedback and the second tactile feedback may be able to represent different textures, respectively. For instance, the first tactile feedback may represent a texture of smooth glass, while the second tactile feedback may represent a texture of a pater having a rough surface.

The display device detects whether a component of the one-way control direction is included in an inputted drag and may be then able to generate the same tactile feedback with different intensity in accordance with a result of the detection. In particular, when a drag in the one-way control direction is inputted, the display device may generate a first tactile feedback with a first intensity. When a drag in direction opposite to the one-way control direction is inputted, the display device may generate the first tactile feedback with a second intensity. Therefore, the display device may be able to provide a user with a tactile feedback of the same texture with a different intensity.

As mentioned in the above description, a display device sets a direction of a one-way control to a direction of an initial drag for a user's touch input including a plurality of drags applied to a displayed object and may be able to control the object in the established one-way control direction only. Through this, the user is able to continuously control the object in the one-way control direction through a plurality of the drags without releasing a contact with a display device. Moreover, the display device is able to selectively generate a tactile feedback by comparing the one-way control direction and a direction of an inputted drag with each other. Using the generated tactile feedback, the user recognizes the one-way control direction and is then able to recognize that a drag in specific direction is applied to the object.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
a display unit configured to display an object;
a sensor unit configured to detect a contact with a region of the displayed object on the display unit and a first touch input of dragging while the contact on the display unit is maintained; and
a controller configured to control the object in a direction of a one-way control in response to the first touch input,
wherein, when the first touch input includes a first drag performed in an upward direction and a second drag performed in a downward direction, the direction of the one-way control is set up by an initial drag direction of the first touch input, and wherein, when the first drag is an initial drag, the direction of the one-way control is set to the upward direction and the object is controlled in the upward direction only corresponding to the first drag without being controlled in the downward direction corresponding to the second drag.

2. The display device of claim 1, wherein the object is displayed in a manner of being shifted by the first drag in the direction of the one-way control from a first position to a second position and wherein the object is not shifted by the second drag by maintaining the second position to which the object has been shifted by the first drag.

3. The display device of claim 1, wherein the initial drag direction of the first touch input is determined by a direction of the first drag or the second drag which initially performed over a preset distance.

4. The display device of claim 1, further comprising:
a tactile feedback unit configured to generate a tactile feedback,
wherein the tactile feedback is generated to correspond to an attribute of the object.

5. The display device of claim 4, wherein the attribute of the object includes at least one of material quality, texture, brightness, color and weight sense of the object.

6. The display device of claim 1, further comprising:
a tactile feedback unit configured to generate a tactile feedback,
wherein a first tactile feedback is generated when the first drag is inputted and wherein a second tactile feedback is further generated when the second drag is inputted.

7. The display device of claim 1, further comprising:
a tactile feedback unit configured to generate a tactile feedback,
wherein a first tactile feedback is generated with a first intensity when the first drag is inputted and wherein a second tactile feedback is further generated with a second intensity when the second drag is inputted.

8. The display device of claim 1, further comprising:
a tactile feedback unit configured to generate a tactile feedback,
wherein the tactile feedback unit generates the tactile feedback using ultrasonic vibration and controls an intensity of the tactile feedback by changing at least one of a frequency and size of the ultrasonic vibration.

9. The display device of claim 1, further comprising:
a tactile feedback unit configured to generate a tactile feedback,
wherein the tactile feedback unit provides the tactile feedback by generating a microscopic current on the display unit and controls the tactile feedback by adjusting an intensity and generated period of the microscopic current.

10. The display device of claim 1, wherein the object includes a control interface configured to control the display device and wherein the display device controls a function of the control interface in response to the first drag but does not control the function of the control interface in response to the second drag.

11. The display device of claim 10, wherein a function of the object is to control the function of the control interface corresponding to a length of the first drag.

12. The display device of claim 10, wherein the control interface includes a volume control interface and wherein a function of the control interface is to control a volume of the display device.

13. The display device of claim 10, wherein the control interface includes a channel control interface and wherein a function of the control interface is to control channels of the display device.

14. The display device of claim 10, wherein the control interface includes a playback control interface and wherein a function of the control interface is to control a playback of a displayed content.

15. The display device of claim 1, wherein the direction of the one-way control of the object is maintained in a same direction while the contact is maintained.

16. The display device of claim 1, wherein the direction of the one-way control is initialized when the contact is released.

17. The display device of claim 16, wherein if the direction of the one-way control is initialized, the direction of the one-way control is reset by an initial drag direction of a second touch input applied after completion of the first touch input.

18. The display device of claim 1, comprising at least one of a smart phone, a smart pad, a music player, a smart table, a monitor, a television set and a tablet computer.

19. The display device of claim 1, wherein, when the second drag is an initial drag, the direction of the one-way control is set to the downward direction and the object is controlled in the downward direction only corresponding to the second drag without being controlled in the upward direction corresponding to the first drag.

20. A method of controlling a display device, comprising the steps of:
   displaying an object on a display unit;
   detecting a contact with a region of the displayed object on the display unit;
   detecting a first touch input of dragging while the contact on the display unit is maintained; and
   controlling the object in a direction of a one-way control in response to the first touch input,
   wherein, when the first touch input includes a first drag performed in an upward direction and a second drag performed in a downward direction, the direction of the one-way control is set up by an initial drag direction of the first touch input, and
   wherein, when the first drag is an initial drag, the direction of the one-way control is set to the upward direction and the object is controlled in the upward direction only corresponding to the first drag without being controlled in the downward direction corresponding to the second drag.

21. A method of controlling a display device, comprising the steps of:
   displaying an object on a display unit;
   detecting a contact with a region of the displayed object on the display unit;
   detecting a first touch input of dragging the displayed object in a downward direction while the contact on the display unit is maintained; and
   controlling the object in the downward direction in response to the first touch input,
   wherein the downward direction is set to a direction of a one-way control of the object, and
   wherein the object is controlled in the direction of the one-way control only, even when a direction of the first touch input changed to an upward direction while the contact is maintained.

* * * * *